US010310966B1

United States Patent
Ge et al.

(10) Patent No.: US 10,310,966 B1
(45) Date of Patent: Jun. 4, 2019

(54) AUTOMATIC TEST STACK CREATION VIA PRODUCTION SYSTEM REPLICATION

(71) Applicant: Amazon Technologies, Inc., Seattle, WA (US)

(72) Inventors: Liang Ge, Seattle, WA (US); Mohit Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 15/611,535

(22) Filed: Jun. 1, 2017

(51) Int. Cl.
  *G06F 11/00* (2006.01)
  *G06F 11/36* (2006.01)
  *G06F 9/455* (2018.01)

(52) U.S. Cl.
  CPC ...... *G06F 11/3664* (2013.01); *G06F 9/45504* (2013.01); *G06F 11/3612* (2013.01)

(58) Field of Classification Search
  CPC .................... G06F 11/2294; G06F 11/0748
  USPC ...................................... 714/38.14
  See application file for complete search history.

(56) References Cited

U.S. PATENT DOCUMENTS

| 2016/0098340 A1* | 4/2016 | Weaver | G06F 21/55 714/38.1 |
| 2016/0117231 A1* | 4/2016 | Lee | G06F 11/1469 714/4.11 |
| 2017/0134411 A1* | 5/2017 | Ye | H04L 63/1425 |

* cited by examiner

*Primary Examiner* — Sarai E Butler
(74) *Attorney, Agent, or Firm* — Knobbe Martens Olson & Bear LLP

(57) ABSTRACT

A virtual private cloud (VPC) that includes one or more computing devices (e.g., a physical computing device, a virtual computing device, etc.) that each implement a service present in an actual production environment is provided herein. For example, at the request of a user, an instance deployment manager may replicate one or more of the services provided by an actual production environment such that the services can be executed by the computing devices within the VPC. The computing devices within the VPC may be configured to communicate with each other. However, the computing devices may not communicate with devices outside the VPC. Thus, the VPC may represent a sandboxed or isolated test stack that allows a user to independently test code within a replicated production environment.

20 Claims, 4 Drawing Sheets

US 10,310,966 B1

AUTOMATIC TEST STACK CREATION VIA PRODUCTION SYSTEM REPLICATION

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete or otherwise manage virtual machines in a dynamic matter. In turn, users can request computer resources from a data center, including single computing devices or a configuration of networked computing devices, and be provided with varying numbers of virtual machine resources.

Virtualized networks provide advantages over traditional networks, in that the can be rapidly created, configured, or destroyed without reconfiguring underlying physical hardware devices. However, typical virtualized systems may lack the testing infrastructure necessary to test code in a non-production environment. Thus, existing functionalities and practices to test code on typical computing devices may not be directly usable on typical virtualized systems.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
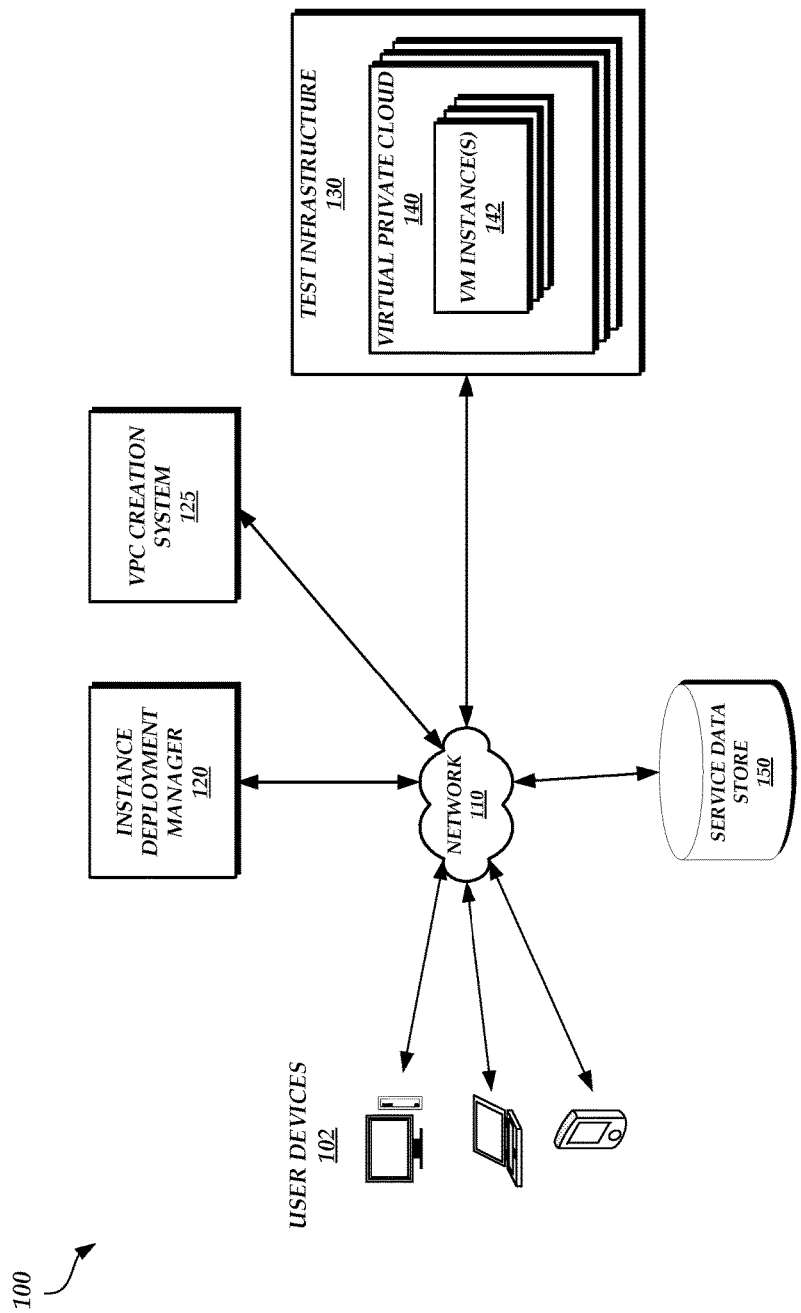
FIG. 1 is a block diagram of an illustrative operating environment in which a test stack is automatically provisioned via one or more virtual machine instances hosted by physical computing devices within a VPC.

Generally described, the present disclosure relates to providing a test stack that is a replica of a production system within a virtual private cloud network environment. Users can access the test stack to test code before the code is released into an actual production system. The term "production system" or "production environment" may refer to, for example, a publicly-accessible system that receives user requests and executes code. The user that submits the request may be an entity other than the entity that manages the code and the request may be submitted via a network external to the system.

A "virtual private cloud network environment" (sometimes shortened to "virtual private cloud" or simply "VPC") generally refers to a virtualized network environment, in which a collection of computing devices is enabled, for example, by a substrate network, to communicate, including for example as if the collection of computing devices existed within a local area network (LAN) environment. Accordingly, the devices within a VPC may often share a common subnet, and (from the perspective of the devices) directly communicate with one another without the use of complex routing protocols. However, unlike traditional LANs, the devices within a VPC need not share a direct physical interconnection. Instead, the devices may be located in geographically diverse regions, and in some instances may themselves be virtual devices (e.g., virtual machines). A substrate (e.g., physical) network may encapsulate or otherwise alter communications from devices associated with the VPC to create the illusion, from the point of view of devices within the VPC, that a LAN environment exists. VPCs provide many advantages over traditional LANs, in that the configuration of computing devices can be changed dynamically, via software, without changing a physical configuration of devices. Moreover, VPCs maintain many benefits of traditional LANs in that communications between the computing devices are relatively simple and secure. A single data center may include sufficient hardware to implement multiple VPCs, each of which may be isolated from each other (e.g., each VPC may include a separate substrate network). Additional details of the components included in VPCs and the techniques used to implement VPCs are described in U.S. patent application Ser. No. 15/245,089, entitled "EXTERNAL HEALTH CHECKING OF VIRTUAL PRIVATE CLOUD NETWORK ENVIRONMENTS" and filed on Aug. 23, 2016, which is hereby incorporated herein by reference in its entirety.

As described above, typical virtualized systems may lack the testing infrastructure necessary to allow users to test code in a non-production environment. For example, some users may test code on their user device. However, individual user devices are not in communication with or otherwise integrated with other devices, servers, and/or the like that provide services necessary to simulate a production environment. For example, such services may include a routing service (e.g., a service that manages communications and/or traffic routing within a production system), a control plane service (e.g., a service that controls the operation of computing devices within a production system), a persistent block storage service (e.g., a service that assigns persistent block storage volumes to virtual machine instances within a production system), a data center placement control service (e.g., a service that determines a location to place persistent block storage volumes), a client service (e.g., a service that couples a persistent block storage service to a virtual machine instance to allow reads and writes between the persistent block storage and the virtual machine instance to occur), a user metadata management service, and/or the like. Thus, users may not be able to properly simulate the execution of new code in a production environment.

Other users may test code within a non-production system that provides shared computing resources. For example, a plurality of users may each manage code that is dependent on the code managed by other users in the plurality. A non-production system may provide computing resources that can be shared by the users in the plurality such that the users can simultaneously test their respective code within the same environment. However, such non-production systems provide no mechanism for ensuring that the test code managed by one user is compatible with the test code managed by another user. Thus, if the test code managed by one user fails, the user may not be able to determine whether the test code failed because of an incompatibility with other code being tested by other users or whether the test code failed due to actual bugs or errors within the test code itself. In addition, even if a user's test code runs properly in the non-production system, the non-production system would need to be constantly updated by an administrator to account for updates to services running in the actual production environment.

To address these issues, the present disclosure provides a VPC that includes one or more computing devices (e.g., a physical computing device, a virtual computing device, etc.) that each implement a service present in the actual production environment. For example, the actual production environment may be a network-based block storage service, which includes a routing service, a control plane service, a persistent block storage service, a data center placement control service, a client service, a user metadata management service, and/or the like. At the request of a user, an instance deployment manager may replicate one or more of the services provided by an actual production environment such that the services can be executed by the computing devices within the VPC. The computing devices within the VPC may be configured to communicate with each other. However, the computing devices may not communicate with devices outside the VPC. Access to the VPC may further be restricted to a select group of users. Thus, the VPC may represent a sandboxed or isolated test stack that allows a user to independently test code within a replicated production environment.

The VPC may be launched by an instance deployment manager when a user requests a test stack. As an illustrative example, upon receiving a request for a test stack, the instance deployment manager can verify the user's credentials. Upon successful user authentication, the instance deployment manager can instruct a VPC creation system to create the VPC with certain networking and security settings. The VPC creation system can also launch one or more computing devices within the VPC. For the purposes of simplicity, the one or more computing devices are described herein as being virtual computing devices or virtual machine instances. However, this is not meant to be limiting. As described above, the one or more computing devices can alternatively or in addition be physical computing devices.

Once the virtual machine instances are launched, the instance deployment manager can retrieve bundles of code from a data store, where the code in each bundle, when executed, causes the executing device to implement one or more services provided by a production system. For each bundle, the instance deployment manager can extract the code and apply the extracted code to a different virtual machine instance. Thus, each virtual machine instance may be associated with a different production system service such that when the code of the respective virtual machine instance is executed, the respective virtual machine instance implements one production system service.

In addition, a user device and/or the instance deployment manager can provide the test code to the VPC for application to one or more of the virtual machine instances (or a new virtual machine instance that has yet to be launched). Because the virtual machine instances may communicate with one another, one or more production system services used by the test code are available within the VPC when the test code is executed. An authorized user may then access the VPC to initiate the execution of the test code and/or to simulate various scenarios within the replicated production environment.

As will be appreciated by one of skill in the art in light of the present disclosure, the embodiments disclosed herein improve the ability of computing systems, such as those implementing virtual private cloud network environments, to test code before the code is deployed to an actual production system. For example, the instance deployment manager disclosed herein provides functionality to allow a user to launch a test stack that includes a replicated, current version of an actual production system via a single request. Access to the VPC that represents the test stack may be restricted, reducing the likelihood that compatibility errors will occur. Furthermore, the computing devices within the VPC (e.g., the virtual machine instances) may be blocked from communicating with devices or components outside the VPC, thereby ensuring that any simulations or tests run within the VPC do not affect operations within the actual production system. Thus, the present disclosure represents an improvement on existing virtual network systems and computing systems in general.

The foregoing aspects and many of the attendant advantages of this disclosure will become more readily appreciated as the same become better understood by reference to the following detailed description, when taken in conjunction with the accompanying drawings.

Example Test Stack Creation Environment

FIG. 1 is a block diagram of an illustrative operating environment 100 in which a test stack is automatically provisioned via one or more virtual machine instances 142 hosted by physical computing devices within a VPC 140. The operating environment 100 further includes user devices 102, an instance deployment manager 120, a VPC creation system 125, a test infrastructure 130 that houses the VPC 140, and a service data store 150. As illustrated in FIG. 1, the test infrastructure 130 can house one or more VPCs 140 that each include one or more virtual machine instances 142 hosted by physical computing devices within the respective VPC 140.

The VPC 140 may represent a private virtualized network implemented by a substrate network. The VPC 140 may be present within a multi-tenant service provider environment. For example, other VPCs 140 associated with different users may be present along with the VPC 140 in the test infrastructure 130. The VPC 140 includes, for example, one or more virtual machine instances 142. However, as described above, the VPC 140 may alternatively or in addition include physical computing devices that implement the functionality of the virtual machine instances 142 described herein. The virtual machine instances 142 may each be hosted by one or more physical computing devices within the VPC 140. The virtual machine instances 142 may each implement a service provided by an actual production system. For example, a service may include a routing service (e.g., a service that manages communications and/or traffic routing within a production system), a control plane service (e.g., a service that controls the operation of computing devices within a production system), a persistent block storage service (e.g., a service that assigns persistent block storage volumes to virtual machine instances within a production system), a data center placement control service (e.g., a service that determines a location to place persistent block storage volumes), a client service (e.g., a service that couples a persistent block storage service to a virtual machine instance to allow reads and writes between the persistent block storage and the virtual machine instance to occur), a user metadata management service, and/or the like.

The instance deployment manager 120 may be one or more physical computing devices with one or more processors that execute instructions to launch the VPC 140, delete the VPC 140, and/or provide descriptive information of the VPC 140 (e.g., an identification of the virtual machine instances 142 that have been launched within the VPC 140 and/or a health status of the launched virtual machine instances 142, as described in greater detail below). For example, a user, via a user device 102, can transmit a request to the instance deployment manager 120 to launch, delete, or provide descriptive information of the VPC 140 via a network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

Upon receiving an instruction to launch the VPC 140 from a user device 102 (e.g., a request to launch a test stack), the instance deployment manager 120 can verify credentials of the user. For example, the instruction may include a username and password combination along with information defining the desired test stack (e.g., the desired production system services and/or the version of such services, etc.). The instance deployment manager 120 can transmit the username and password combination to an authentication service (not shown) and/or verify the credentials internally. If the authentication service and/or the instance deployment manager 120 successfully authenticates the user, then the instance deployment manager 120 instructs the VPC creation system 125 to create the VPC 140 in the test infrastructure 130. The instance deployment manager 120 also returns a test stack identifier to the user device 102. The test stack identifier can be used to access the VPC 140 and/or to receive descriptive information of the VPC 140, as described in greater detail below.

The VPC creation system 125 may create the VPC 140 by, for example, configuring network and/or security settings, creating instance profile and/or roles, and/or launching one or more virtual machine instances 142. After instructing the VPC creation system 125 to create the VPC 140, the instance deployment manager 120 can periodically query or poll the test infrastructure 130 (e.g., the VPC 140) to determine whether one or more of the launched virtual machine instances 142 are available (e.g., accessible by the instance deployment manager 120, the VPC creation system 125, and/or test infrastructure 130, ready to receive code for execution, able to receive and/or respond to communications from other virtual machine instances 142, the instance deployment manager 120, the VPC creation system 125, and/or the test infrastructure 130, etc.). If any of the launched virtual machine instances 142 are not available after a threshold period of time passes, then the test stack creation may fail and the instance deployment manager 120 can notify the user device 102 that requested the VPC 140 (e.g., test stack) of the failure.

Otherwise, if the launched virtual machine instances 142 are available after a threshold period of time passes, then the instance deployment manager 120 may retrieve code from the service data store 150, generate keys (e.g., access keys, secret keys, etc.) for use by the virtual machine instances 142, and/or activate the launched virtual machine instances 142 (e.g., apply the retrieved code to the launched virtual machine instances 142). For example, the service data store 150 may store bundles of code that are each associated with a different production system service. The code in a bundle, when executed, causes the executing device (e.g., the virtual machine instance 142) to implement one of the production system services. The service data store 150 may be updated with new bundles of code as production system services are updated. Thus, the service data store 150 may store current versions of code used to implement various production system services. The instance deployment manager 120 can retrieve one or more bundles from the service data store 150, extract code from the bundles, and apply the code extracted from an individual bundle to an individual virtual machine instance 142.

Once the virtual machine instances 142 are activated, the instance deployment manager 120 can periodically check the health of each of the activated virtual machine instances 142. For example, the instance deployment manager 120 can transmit a query to the test infrastructure 130 to provide a health status of a particular virtual machine instance 142 in the VPC 140. A virtual machine instance 142 may have a healthy status if the virtual machine instance 142 is able to execute code without runtime errors or other failures. Conversely, a virtual machine instance 142 may have an unhealthy status if execution of code causes errors, a hardware failure occurs (e.g., the physical computing device that hosts the virtual machine instance 142 has a hardware component (e.g., processor, memory, storage device, etc.) that fails), and/or the like. If any of the activated virtual machine instances 142 have an unhealthy status after a threshold period of time passes, then the test stack creation may fail and the instance deployment manager 120 can notify the user device 102 that requested the VPC 140 (e.g., test stack) of the failure.

Otherwise, if the activated virtual machine instances 142 all have a healthy status, then the VPC 140 may be ready for use by a user that requested the test stack. Access to the VPC 140 may be restricted to the user associated with the user device 102 that submitted the request to launch the VPC 140 and/or any other users designated by the user that caused the launch of the VPC 140. An authorized user may access the VPC 140 by providing to the test infrastructure 130 the appropriate credentials (e.g., username and password) using the user device 102.

Furthermore, the activated virtual machine instances 142 may not communicate with devices or components outside of the VPC 140. Thus, the VPC 140 may be an isolated environment in which only authorized users can run simulations. In addition, multiple user devices 102 may independently submit requests to launch a test stack. Therefore, the test infrastructure 130 may include a plurality of VPCs 140 that each correspond to one of the requests. Additional details on the process for launching the VPC 140 are described below with respect to FIGS. 3 and 4.

Once the VPC 140 is launched, an authorized user can use a user device 102 to access the VPC 140 to run simulations of test code. For example, the user device 102 can access the VPC 140 by providing the appropriate user credentials and upload or otherwise provide test code to the VPC 140. The VPC 140 can store the test code in one or more of the launched virtual machine instances 142 in addition to the code corresponding to the production system services that are already activated and stored therein. Alternatively, the VPC 140 can launch a new virtual machine instance 142 and store the test code therein.

A user can control the simulation using the user device 102. For example, the user can transmit an instruction to the test infrastructure 130 to test the test code via the user device 102. The test infrastructure 130 can then forward the instruction to the appropriate VPC 140. When the instruction to test the code is received by the appropriate VPC 140, the virtual machine instance(s) 142 that includes the test code executes the test code to initiate a simulation of the test code in a production environment. Because the virtual machine instances 142 may communicate with one another, the virtual machine instance 142 executing the test code can access data provided by the production system services implemented by the other virtual machine instances 142 in order to properly simulate the production environment.

Upon receiving an instruction to delete the VPC 140 from a user device 102 (e.g., a request to delete the test stack), the instance deployment manager 120 can either instruct the test infrastructure 130 to delete the VPC 140 or instruct the VPC creation system 125 to delete the VPC 140. An instruction to delete the VPC 140 may cause the test infrastructure 130 to delete and/or reformat the physical computing devices hosting the previously-activated virtual machine instances 142 such that the physical computing devices can be re-provisioned for use with another VPC 140 or for use with other applications.

Upon receiving an instruction to provide descriptive information of the VPC 140 from a user device 102, the instance deployment manager 120 can transmit a request to the test infrastructure 130 to provide an identification of the virtual machine instances 142 that have been launched within the VPC 140 and/or a health status of the launched virtual machine instances 142. After receiving the requested information from the test infrastructure 130, the instance deployment manager 120 can transmit such information to the user device 102.

While the instance deployment manager 120 is depicted in FIG. 1 as being external to the VPC creation system 125 and the test infrastructure 130, this is not meant to be limiting. For example, the instance deployment manager 120 may be located internal (not shown) to the VPC creation system 125 or the test infrastructure 130.

The VPC creation system 125 may be one or more physical computing devices with one or more processors that execute instructions to launch VPCs 140 in a manner as described herein. While the VPC creation system 125 is depicted in FIG. 1 as being external to the instance deployment manager 120 and the test infrastructure 130, this is not meant to be limiting. For example, the VPC creation system 125 may be located internal (not shown) to the instance deployment manager 120 or the test infrastructure 130.

The test infrastructure 130 can be a computing system programmed or otherwise configured to host one or more VPCs 140 as described herein. The test infrastructure 130 may be a single computing device or may include multiple distinct computing devices, such as computer servers, logically or physically grouped together to collectively operate as a server system. The components of the test infrastructure 130 can be implemented in application-specific hardware (e.g., a server computing device with one or more ASICs) such that no software is necessary, or as a combination of hardware and software. In addition, the modules and components of the test infrastructure 130 can be combined on one server computing device or separated individually or into groups on several server computing devices. Thus, the physical computing devices that comprise the VPC 140 may be located on one server computing device or separated individually or into groups on several server computing devices. In some embodiments, the test infrastructure 130 may include additional or fewer components than illustrated in FIG. 1.

In some embodiments, the features and services provided by the test infrastructure 130 may be implemented as web services consumable via the communication network 110. In further embodiments, the test infrastructure 130 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The service data store 150 may be located external to the instance deployment manager 120, the VPC creation system 125, and/or the test infrastructure 130. For example, the service data store 150 may be stored and managed by a separate system or server and may be in communication with the instance deployment manager 120, the VPC creation system 125, and/or the test infrastructure 130 via a direct connection or an indirect connection (e.g., via a network, such as the network 110). In other embodiments, not shown, the service data store 150 is located within the instance deployment manager 120, the VPC creation system 125, and/or the test infrastructure 130.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application and/or a standalone application to request a test stack, to request descriptive information of the VPC 140, and/or to access the VPC 140 for running simulations of test code.

Example Block Diagram for Requesting Content

Figure 2:
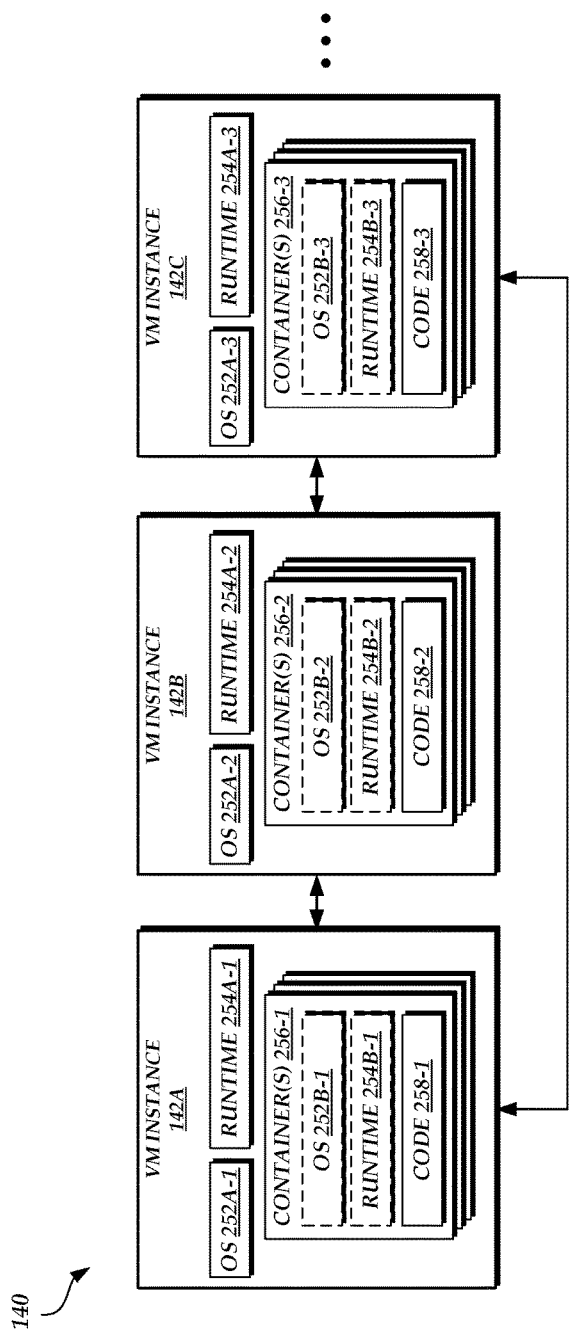
FIG. 2 illustrates an example block diagram of the VPC of FIG. 1, according to one embodiment.

FIG. 2 illustrates an example block diagram of the VPC 140 of FIG. 1, according to one embodiment. As illustrated in FIG. 2, the VPC 140 can include a plurality of virtual machines instances 142A-C. Each of the virtual machine instances 142A-C may be configured to communicate with the other virtual machine instances 142A-C in the VPC 140. However, the virtual machine instances 142A-C may not communicate with virtual machine instances or physical computing devices outside the VPC 140. While FIG. 2 depicts three virtual machine instances 142A-C, this is not meant to be limiting. The VPC 140 may include any number of virtual machine instances 142A-C. In some embodiments, the number of virtual machine instances 142A-C in the VPC 140 matches the number of production system services requested by the user device 102 when transmitting a request to launch a test stack.

Furthermore, each virtual machine instance 142A-C may be configured to execute code or tasks. For example, virtual machine instances 142A-C may have operating systems (OS) 252A, language runtimes 254A, and containers 256.

Containers 256 are logical units created within a computing device using the resources available on that device, and may be utilized to isolate execution of a task from other processes occurring on the device. For example, in order to implement a production system service, the virtual machine instance 142 may include a container 256 within which to execute the code corresponding to the production system service. Containers 256 may be implemented, for example, as Linux containers. The containers 256 may have individual copies of the OSs 252B, the runtimes 254B, and code 258. The code 258 may be the code extracted from a bundle retrieved from the service data store 150 by the instance deployment manager 120, where the code 258, when executed, causes the virtual machine instance 142A-C to implement a production system service.

In some embodiments, the code 258 can be updated by a user device 102 once the VPC 140 is available for use. For example, a user device 102 can transmit an instruction to the VPC 140 (or a particular virtual machine instance 142) to update the code 258 stored in a container 256 of a particular virtual machine instance 142, where the instruction includes an identification of the virtual machine instance 142 and/or container 256 and the updated code 258 to replace the previously stored code 258. The virtual machine instance 142 identified by the instruction may receive the updated code 258 from the VPC 140 and can execute a process (e.g., based on a set of computer-executable instructions stored in another container 256) to replace the previously stored code 258 with the updated code 258. Alternatively, the virtual machine instance 142 identified by the instruction may create a new container 256 and store the updated code 258 in the new container 256.

As described above, a launched virtual machine instance 142A-C may store the test code received from the user device 102 once the VPC 140 is launched. In such a scenario, the virtual machine instance 142A-C may include one container 256 that includes code 258 corresponding to a production system service and may include a second container 256 that includes the test code. Thus, execution of the code 258 to implement a production system service may be isolated from the execution of the test code.

Example Block Diagram for Launching a Test Stack

Figure 3:
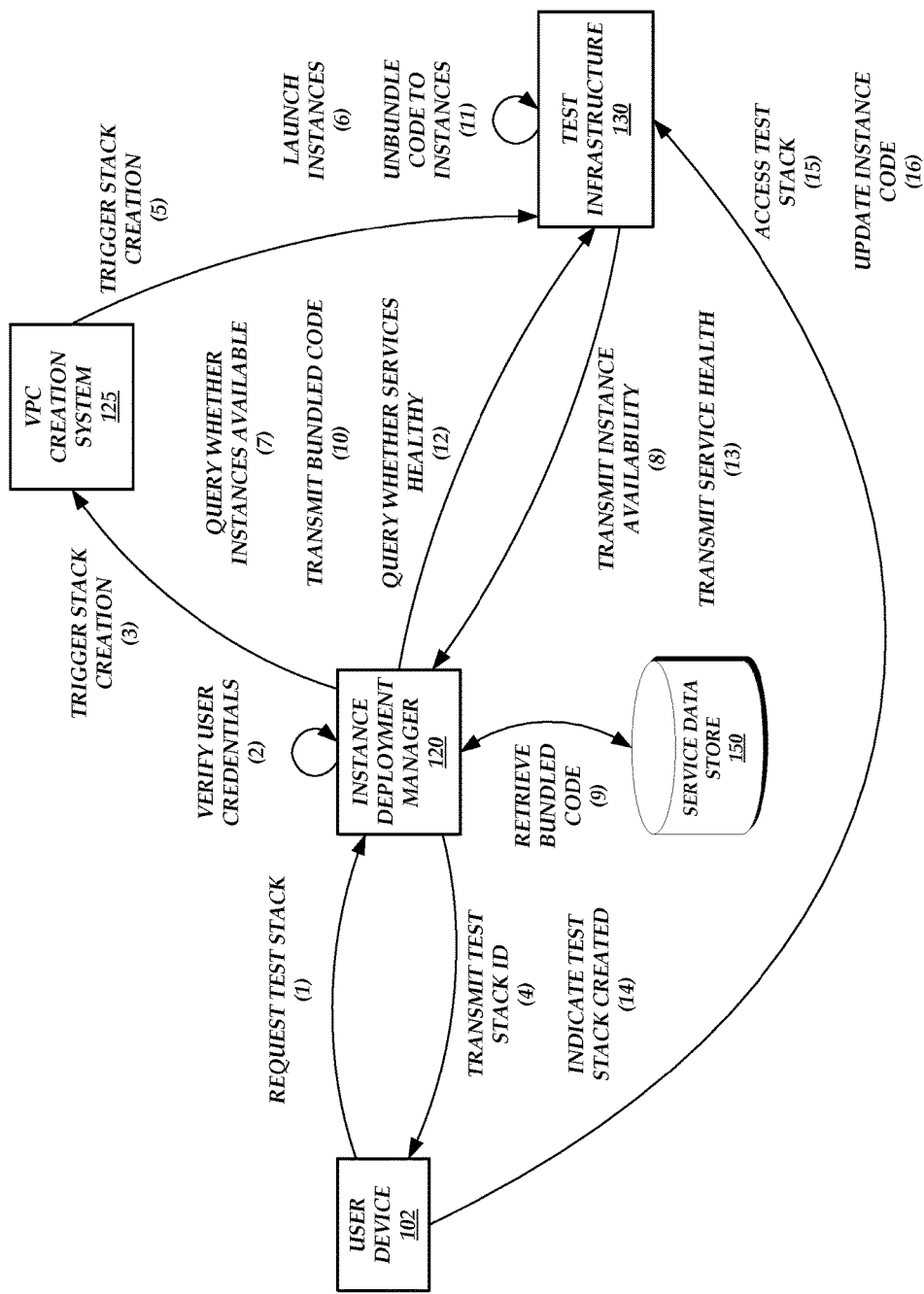
FIG. 3 is a block diagram of the operating environment of FIG. 1 illustrating the operations performed by the components of the operating environment to launch a test stack, according to one embodiment.

FIG. 3 is a block diagram of the operating environment 100 of FIG. 1 illustrating the operations performed by the components of the operating environment 100 to launch a test stack, according to one embodiment. As illustrated in FIG. 3, a user device 102 may transmit a request for a test stack to the instance deployment manager 120 at (1). The request for the test stack may include user credentials (e.g., a username and password combination), an indication of the individual production system services to be included in the test stack and/or the version of such services, a number of copies of each production system service to be included in the test stack (e.g., 1000 copies of the same production system service may be requested and included in the test stack to run a stress test), and/or the like.

The instance deployment manager 120 can then verify the user credentials at (2) to determine whether the credentials can be authenticated and/or whether the user associated with the credentials is authorized to create a test stack. Alternatively, the instance deployment manager 120 can send the user credentials to an external authentication service for verification. If the user credentials can be verified, the instance deployment manager 120 can trigger creation of the test stack by sending a message to the VPC creation system 125 at (3) and can transmit a test stack identifier (ID) to the user device 102 at (4). As described herein, the test stack ID can be used to access the VPC 140 and/or retrieve descriptive information of the VPC 140. For example, the user device 102 can transmit the stack ID to the instance deployment manager 120 with a request to retrieve descriptive information. The instance deployment manager 120 can query the test infrastructure 130 for the descriptive information of the VPC 140 associated with the stack ID and return the results to the user device 102. As another example, the user device 102 can directly transmit the stack ID to the test infrastructure 130 with a request to retrieve descriptive information of the VPC 140 associated with the stack ID, and the test infrastructure 130 can return the results directly to the user device 102. Otherwise, if the user credentials cannot be verified, then the test stack creation fails and the instance deployment manager 120 notifies the user device 102 accordingly.

Once instructed by the instance deployment manager 120, the VPC creation system 125 can trigger creation of the test stack at (5) by instructing the test infrastructure 130 to launch the VPC 140 according to certain parameters. For example, the VPC creation system 125 can instruct the test infrastructure 130 to create a security group and/or networking rules that identify which users are allowed to access the VPC 140 (e.g., which users can access the VPC 140 via a secure shell), what type of traffic can enter the VPC 140 from a component or device external to the VPC 140, and/or what type of traffic can leave the VPC 140 to a component or device external to the VPC 140. The test infrastructure 130 may configure the VPC 140 with the created security group and/or networking rules.

The VPC creation system 125 can also instruct the test infrastructure 130 to create instance profiles and roles. One or more instance profiles may be used by the virtual machine instances 142 within the VPC 140 to access other services implemented by other virtual machine instances 142. These instance profiles may each have certain permissions or roles that define what types of services the respective instance profile can access. Thus, each virtual machine instance 142 may use an instance profile (or multiple instance profiles) that is configured with the permissions necessary to access a service desired by the respective virtual machine instance 142. The test infrastructure 130 may configure the VPC 140 with the created instance profiles and roles.

Finally, the VPC creation system 125 can instruct the test infrastructure 130 to launch (e.g., provision) the virtual machine instances 142 that will comprise the VPC 140. As described herein, the number of virtual machine instances 142 launched may match the number of production system services requested in the test stack request transmitted by the user device 102 at (1). The test infrastructure 130 can launch the virtual machine instances 142 at (6). If creation of the security group and/or networking rules fails, creation of the instance profiles and roles fails, and/or launching of the virtual machine instances 142 fails, then the test infrastructure 130 can notify the VPC creation system 125, which can notify the instance deployment manager 120, which can then notify the user device 102. Alternatively, the test infrastructure 130 and/or the VPC creation system 125 can directly notify the user device 102.

The creation of the security group and/or networking rules, the creation of the instance profiles and roles, and/or the launching of the virtual machine instances 142 can occur asynchronously. For example, creation of the security group and/or networking rules, the creation of the instance profiles and roles, and/or the launching of the virtual machine instances 142 can occur in any order and at any time after the user credentials are verified.

During or after the launch of the virtual machine instances 142, the instance deployment manager 120 can query whether the virtual machine instances 142 are available at (7). For example, the instance deployment manager 120 may submit the query a threshold amount of time after transmitting the test stack creation message at (4). The query may be transmitted to the test infrastructure 130 and may correspond to some or all of the virtual machine instances 142 that were expected to be launched. The test infrastructure 130 can then transmit the instance availability to the instance deployment manager 120 at (8). In some instances, some virtual machine instances 142 are available before others. For example, while the virtual machine instances 142 may be launched by the test infrastructure 130 in parallel, the initiation of the launch of an individual virtual machine instance 142 may occur at different times. If a virtual machine instance 142 is not available (e.g., the launch is not complete, an error occurred during the launch, etc.), then the instance deployment manager 142 may wait a threshold period of time before sending another request for the availability of the virtual machine instances 142 (e.g., all of the virtual machine instances or only those that are not yet available). For each unavailable virtual machine instance 142 (or for all virtual machine instances 142), the instance deployment manager 120 may repeat this process of polling the test infrastructure 130 for the availability of the respective virtual machine instance 142 a threshold number of times (e.g., 2 times, 3 times, 4 times, etc.) or until the respective virtual machine instance 142 is available. If, after polling the test infrastructure 130 the threshold number of times, one or more virtual machine instances 142 are still not available, then the instance deployment manager 120 may determine that the test stack creation has failed and notify the user device 102 accordingly.

On the other hand, if all of the virtual machine instances 142 are available before the instance deployment manager 120 polls the test infrastructure 130 the threshold number of times, then the instance deployment manager 120 triggers activation of the production system services by first retrieving bundled code from the service data store 150 at (9). The retrieved bundled code may correspond to the production system services requested by the user device 102. For example, the service data store 150 may store information identifying to which production system service a particular bundle corresponds. The instance deployment manager 120 can identify to the service data store 150 the requested production system services, and the service data store 150 can respond with the corresponding bundles.

The instance deployment manager 120 may also generate keys (e.g., access keys, secret keys, etc.) for deployment to the launched virtual machine instances 142. For example, in a production system, keys associated with a particular user account are generally encrypted and stored within physical computing devices for use by the production system services. While the VPC 140 may represent a replicated version of the production system, the virtual machine instances 142 that implement the production system services may nonetheless expect the keys to be available for use. Thus, the instance deployment manager 120 can generate the keys for eventual transmission to the test infrastructure 130 and storage in the virtual machine instances 142. In an embodiment, the generated keys are unique to the user that requested the test stack.

Finally, the instance deployment manager 120 may also activate the environments that enable the virtual machine instances 142 to operate. For example, the instance deployment manager 120 can transmit the bundled code retrieved from the service data store 150 to the test infrastructure 130 at (10). The test infrastructure 130 may then unbundle the code to the appropriate virtual machine instances 142 at (11). For example, the test infrastructure 130 may extract the code from the bundles and store individual extracted code in different virtual machine instances 142. As described herein, the same production system service may be implemented by multiple virtual machine instances 142. Thus, the same extracted code may be stored in one or more virtual machine instances 142. The instance deployment manager 120 can notify the test infrastructure 130 of the number of different virtual machine instances 142 that should implement the same production system service. The environments (e.g., the virtual machine instances 142) can be activated sequentially or in parallel.

In one alternative, not shown, the instance deployment manager 120 can extract the code from the bundles and transmit the extracted code to the test infrastructure 130. The test infrastructure 130 can then store the extracted code in the appropriate virtual machine instances 142. In another alternative, not shown, the instance deployment manager 120 can grant the test infrastructure 130 with read-only access and/or read-write access to the service data store 150. The instance deployment manager 120 can also indicate to the test infrastructure 130 which production system services and/or code to retrieve from the service data store 150. The test infrastructure 130 may then retrieved bundled code from the service data store 150 and then unbundle the code to the appropriate virtual machine instances 142.

If retrieval of the bundles fails, the generation of the keys fails, and/or the activation of the environments fails, then the instance deployment manager 120 and/or the test infrastructure 130 can notify the user device 102.

The retrieval of the bundles, the generation of the keys, and/or the activation of the environments can occur asynchronously. For example, retrieval of the bundles, the generation of the keys, and/or the activation of the environments can occur in any order and at any time after the user credentials are verified.

During or after activation of the production system services, the instance deployment manager 120 can query the health status of the launched virtual machine instances 142 at (12). For example, the instance deployment manager 120 may submit the query a threshold amount of time after transmitting the bundled or unbundled code at (10). The query may be transmitted to the test infrastructure 130 and may correspond to some or all of the virtual machine instances 142 that were launched (e.g., one query may include a request for the health status of one or more of the launched virtual machine instances 142, queries directed to the health status of a particular launched virtual machine instance 142 may be transmitted sequentially, etc.). The test infrastructure 130 can then transmit the health status of the launched virtual machine instances 142 to the instance deployment manager 120 at (13). As described above, a virtual machine instance 142 may have a healthy status if the virtual machine instance 142 is able to execute code without runtime errors or other failures. Conversely, a virtual machine instance 142 may have an unhealthy status if execution of code causes errors, a hardware failure occurs (e.g., the physical computing device that hosts the virtual machine instance 142 has a hardware component (e.g., processor, memory, storage device, etc.) that fails), and/or the like.

If a virtual machine instance 142 is not healthy, then the instance deployment manager 142 may attempt to reactivate the unhealthy virtual machine instance 142 (or all virtual machine instances 142) by repeating the production system service activation process described above (e.g., retrieve the bundles, generate the keys, and/or activate the environments) and querying the health status once again after the reactivation is complete. For each unhealthy virtual machine instance 142 (or for all virtual machine instances 142), the instance deployment manager 120 may repeat the reactivation attempt a threshold number of times (e.g., 2 times, 3 times, 4 times, etc.) or until the respective virtual machine instance 142 has a healthy status. If, after attempting the reactivation the threshold number of times, one or more virtual machine instances 142 are still unhealthy, then the instance deployment manager 120 may determine that the test stack creation has failed and notify the user device 102 accordingly. On the other hand, if all of the virtual machine instances 142 are healthy, then the test stack creation has succeeded and the user device is notified accordingly at (14).

Once creation of the test stack has succeeded, the test stack may be accessible to a user for running simulations. For example, the user device 102 can access the test stack at (15) by communicating with the test infrastructure 130. The user device 102 can upload or provide test code to the test infrastructure 130 for the purposes of testing the test code in the created test stack. Alternatively, the user device 102 can indicate to the test infrastructure 130 a location of the code that is to be tested and/or provide an instruction to retrieve the code.

Optionally, the user device 102 may transmit an instruction to the test infrastructure 130 (e.g., the VPC 140) to update the code stored in a particular virtual machine instance 142 at (16). For example, the instruction may include an identification of a particular virtual machine instance 142 and/or container 256 and the updated code to replace the previously stored code. The virtual machine instance 142 identified by the instruction may receive the updated code from the VPC 140 and can execute a process (e.g., based on a set of computer-executable instructions stored in a container separate from the container that stores the production system service code) to replace the previously stored code with the updated code. Alternatively, the virtual machine instance 142 identified by the instruction may create a new container and store the updated code in the new container.

In further embodiments, the instance deployment manager 120 performs certain operations prior to receiving the request for a test stack in order to reduce the test stack creation time. For example, the instance deployment manager 120 can retrieve libraries (e.g., script libraries) from a data store and cause the test infrastructure 130 to launch the virtual machine instances 142 with the retrieved libraries (e.g., the libraries may be stored in memory accessible by the OS 252, in a container 256, etc.). As another example, the instance deployment manager 120 can format the disks of the physical computing devices that host the virtual machine instances 142 such that prior data stored therein is erased and the disks are configured in the proper format for hosting virtual machine instances 142. As an illustrative example, pre-formatting the disks can reduce the test stack launch time by 6 hours or more.

In an example use case, the launched test stack can be used by the user that requested the test stack to test new code (e.g., a new version of code deployed to a production system, an alternative version of code deployed to a production system, a previous version of code deployed to a production system, entirely new code that has not been deployed to a production system, etc.) in a replica of a production environment to determine whether any updates are necessary before the new code is deployed to a production system. However, in another example use case, the user that requested the test stack can also provide access to the test stack to other users, such as users that will use the services provided by the new code once the new code is deployed to the production system (referred to herein as end users). For example, the user that requested the test stack may want a select set of end users to test the new code such that the end users can provide feedback. Thus, the launched VPC 140 may act as a semi-isolated endpoint (e.g., only accessible by certain end users) that allows end users to test the new code.

Example Test Stack Creation Routine

Figure 4:
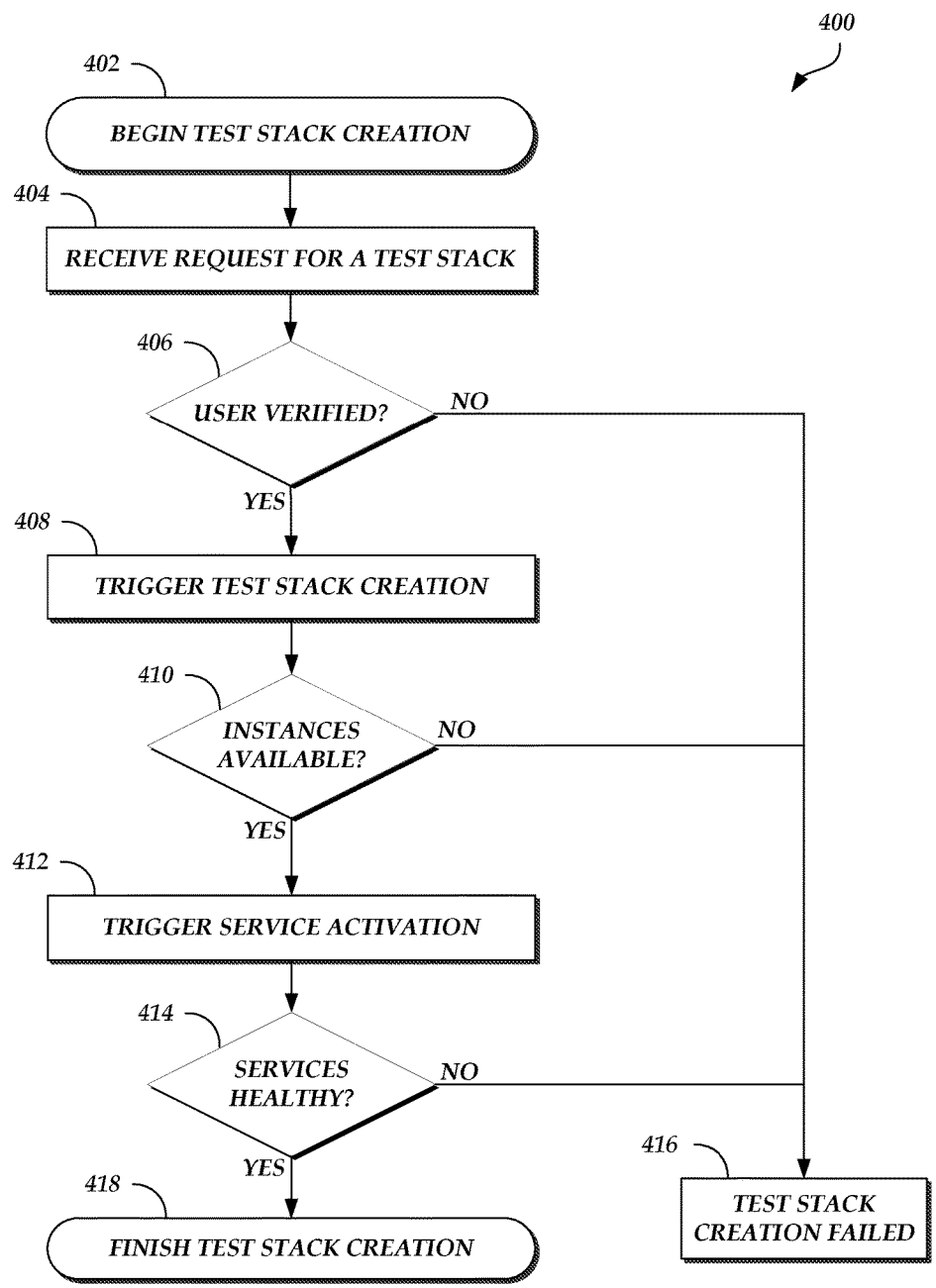
FIG. 4 is a flow diagram depicting a test stack creation routine illustratively implemented by an instance deployment manager, according to one embodiment.

FIG. 4 is a flow diagram depicting a test stack creation routine 400 illustratively implemented by an instance deployment manager, according to one embodiment. As an example, the instance deployment manager 120 of FIG. 1 can be configured to execute the test stack creation routine 400. The test stack creation routine 400 begins at block 402.

At block 404, a request for a test stack is received. The request may include user credentials (e.g., a username and password combination), an indication of the individual production system services to be included in the test stack and/or the version of such services, a number of copies of each production system service to be included in the test stack (e.g., 1000 copies of the same production system service may be requested and included in the test stack to run a stress test), and/or the like.

At block 406, a determination is made as to whether the user can be verified. For example, the user credentials may be verified and/or it may be determined whether a user associated with the credentials is authorized to create a test stack. If the user is verified, the test stack creation routine 400 continues to block 408. Otherwise, if the user is not verified, the test stack creation routine 400 proceeds to block 416.

At block 408, the test stack creation is triggered. For example, the VPC creation system 125 can be instructed by the instance deployment manager 120 to instruct the test infrastructure 130 to create security group and/or networking rules, create the instance profiles and roles, and/or launch the virtual machine instances 142.

At block 410, a determination is made as to whether the virtual machine instances 142 are available. For example, the instance deployment manager 120 can query the test infrastructure 130 to determine whether the launched virtual machine instances 142 are available. If one or more launched virtual machine instances 142 are unavailable, the instance deployment manager 120 may check additional times to determine whether such virtual machine instances 142 are now available. If one or more launched virtual machine instances 142 is still unavailable after multiple queries (e.g., a threshold number of queries), then the test stack creation routine 400 proceeds to block 416. Otherwise, if the launched virtual machine instances 142 are all available, then the test stack creation routine 400 continues to block 412.

At block 412, activation of the service(s) is triggered. For example, the instance deployment manager 120 and/or the test infrastructure 130 can retrieve bundles of code from the service data store 150, generate keys, and/or activate the instance environments (e.g., deploy code extracted from the bundles and/or the generated keys to one or more of the launched virtual machine instances 142).

At block 414, a determination is made as to whether the production system services are healthy. For example, the instance deployment manager 120 can query the test infrastructure 130 to determine the health status of each of the launched virtual machine instances 142. If one or more of the launched virtual machine instances 142 has an unhealthy status, then the instance deployment manager 120 can attempt to reactivate the unhealthy service(s) (e.g., re-deploy code extracted from the bundles and/or the generated keys to the unhealthy virtual machine instance(s) 142). If one or more launched virtual machine instances 142 still has an unhealthy status after multiple reactivation attempts (e.g., a threshold number of attempts), then the test stack creation routine 400 proceeds to block 416. Otherwise, if the launched virtual machine instances 142 all have a healthy status, then the test stack creation routine 400 ends, as shown at block 418.

At block 416, the test stack creation has failed. The user device 102 may be notified of the failure by the instance deployment manager 120, the VPC creation system 125, and/or the test infrastructure 130.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of launching a test stack, the method comprising:
   as implemented by one or more computing devices configured with specific computer-executable instructions,
   receiving a request for the test stack, wherein the request comprises user credentials and an identification of one or more production system services;
   determining that the user credentials are verified;
   transmitting an instruction to launch a virtual private cloud network environment (VPC) and one or more virtual computing devices in the VPC, wherein the one or more virtual computing devices, when launched, are arranged within a virtualized local area network, the virtualized local area network generated by a substrate network hosting the VPC, and wherein the VPC is configured to simulate test code in a replica of a production environment;
   determining that a first virtual computing device in the one or more virtual computing devices is available;
   retrieving first code associated with a first production system service in the one or more production system services;
   causing the first virtual computing device to implement the first code;
   and
   transmitting a notification that the VPC is available to simulate the test code.

2. The computer-implemented method of claim 1, further comprising:
   querying whether a second virtual computing device in the one or more virtual computing devices is available;
   determining that the second virtual computing device is unavailable;
   after a threshold period of time expires, querying whether the second virtual computing device is available; and
   determining that the second virtual computing device is available.

3. The computer-implemented method of claim 1, further comprising:
   retrieving second code associated with a second production system service in the one or more production system services;
   causing a second virtual computing device in the one or more virtual computing devices to implement the retrieved second code;
   querying whether the second virtual computing device comprises a healthy status;
   determining that the second virtual computing device comprises an unhealthy status;
   causing the second virtual computing device to re-store the retrieved second code;
   querying whether the second virtual computing device comprises the healthy status after re-storing the retrieved second code; and
   determining that the second virtual computing device comprises the healthy status.

4. The computer-implemented method of claim 1, further comprising determining that the first virtual computing device comprises a healthy status, wherein the healthy status comprises an indication that the first virtual computing device can execute the first code without runtime errors.

5. The computer-implemented method of claim 1, wherein the first production system service comprises one of a routing service, a control plane service, a persistent block storage service, a data center placement control service, a client service, or a user metadata management service.

6. A system, the system comprising:
   a service data store comprising first code associated with a first production system service in a plurality of production system services; and
   an instance deployment manager comprising a processor configured with specific computer-executable instructions that, when executed, cause the instance deployment manager to at least:
   receive a request for a test stack, wherein the request comprises an identification of the first production system service;
   transmit an instruction to launch a virtual private cloud network environment (VPC) and one or more virtual computing devices in the VPC, wherein the one or more virtual computing devices, when launched, are arranged within a virtualized local area network, and wherein the VPC is configured to simulate test code in a replica of a production environment;
   determine that a first virtual computing device in the one or more virtual computing devices is available;
   retrieve the first code from the service data store; and
   cause the first virtual computing device to implement the retrieved first code.

7. The system of claim 6, wherein the specific computer-executable instructions, when executed, further cause the instance deployment manager to at least:
   query whether a second virtual computing device in the one or more virtual computing devices is available;
   determine that the second virtual computing device is unavailable;
   after a threshold period of time expires, query whether the second virtual computing device is available; and
   determine that the second virtual computing device is available.

8. The system of claim 6, wherein the specific computer-executable instructions, when executed, further cause the instance deployment manager to at least:
   retrieve second code from the service data store, wherein the second code corresponds to a second production system service in the plurality of production system services;
   cause a second virtual computing device in the one or more virtual computing devices to implement the retrieved second code;
   query whether the second virtual computing device comprises a healthy status;
   determine that the second virtual computing device comprises an unhealthy status;
   in response to the determination that the second virtual computing device comprises the unhealthy status, cause the second virtual computing device to re-store the retrieved second code;

query whether the second virtual computing device comprises the healthy status after re-storing the retrieved second code; and determine that the second virtual computing device comprises the healthy status.

9. The system of claim 8, wherein the healthy status comprises an indication that the second virtual computing device can execute the second code without runtime errors.

10. The system of claim 6, wherein the first production system service comprises one of a routing service, a control plane service, a persistent block storage service, a data center placement control service, a client service, or a user metadata management service.

11. The system of claim 6, wherein the first virtual computing device is restricted from communicating with physical computing devices external to the VPC.

12. The system of claim 6, wherein a launch of the test stack fails if a second virtual computing device in the one or more virtual computing devices is unavailable after a threshold period of time.

13. The system of claim 6, wherein a launch of the test stack fails if a second virtual computing device in the one or more virtual computing devices comprises an unhealthy status after reactivation of the second virtual computing occurs a threshold number of times.

14. The system of claim 6, wherein the request further comprises an identification of a version of the first production system service and a number of first production system services to provision in the test stack.

15. The system of claim 14, wherein the number of first production system services to provision in the test stack is greater than one, and wherein the specific computer-executable instructions, when executed, further cause the instance deployment manager to at least cause a second virtual computing device in the one or more virtual computing devices to implement the retrieved first code.

16. Non-transitory, computer-readable storage media comprising computer-executable instructions for launching a test stack, wherein the computer-executable instructions, when executed by a computer system, cause the computer system to:

process a request for the test stack, wherein the request comprises an identification of a first production system service in a plurality of production system services;

transmit an instruction to launch a virtual private cloud network environment (VPC) and one or more virtual computing devices in the VPC, wherein the one or more virtual computing devices, when launched, are arranged within a virtualized local area network, and wherein the VPC is configured to simulate test code in a replica of a production environment;

determine that a first virtual computing device in the one or more virtual computing devices is available; and cause the first virtual computing device to implement first code.

17. The non-transitory, computer-readable storage media of claim 16, wherein the computer-executable instructions further cause the computer system to:

query whether a second virtual computing device in the one or more virtual computing devices is available;

determine that the second virtual computing device is unavailable;

after a threshold period of time expires, query whether the second virtual computing device is available; and determine that the second virtual computing device is available.

18. The non-transitory, computer-readable storage media of claim 16, wherein the computer-executable instructions further cause the computer system to:

cause a second virtual computing device in the one or more virtual computing devices to implement second code;

query whether the second virtual computing device comprises a healthy status;

determine that the second virtual computing device comprises an unhealthy status;

in response to the determination that the second virtual computing device comprises the unhealthy status, cause the second virtual computing device to re-store the second code;

query whether the second virtual computing device comprises the healthy status after re-storing the retrieved second code; and determine that the second virtual computing device comprises the healthy status.

19. The non-transitory, computer-readable storage media of claim 18, wherein the healthy status comprises an indication that the second virtual computing device can execute the second code without runtime errors.

20. The non-transitory, computer-readable storage media of claim 16, wherein the first production system service comprises one of a routing service, a control plane service, a persistent block storage service, a data center placement control service, a client service, or a user metadata management service.

* * * * *